July 30, 1929.  A. E. GLANCY  1,722,520
LENS SEATING DEVICE
Filed Nov. 11, 1925
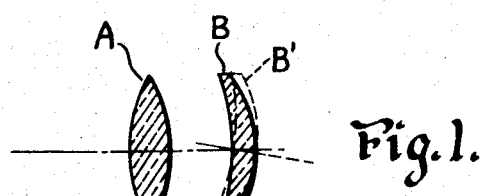
Fig.1.
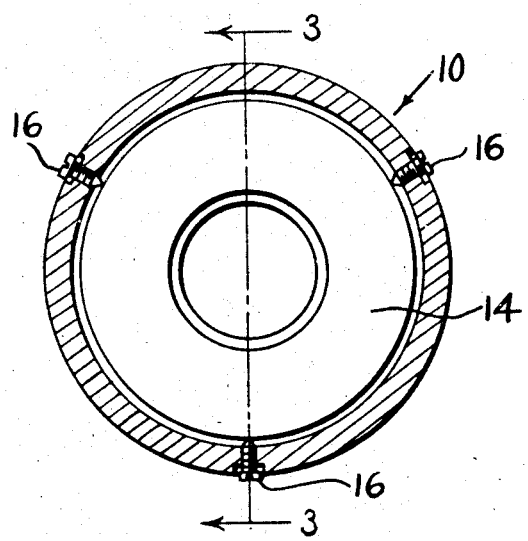
Fig.2.
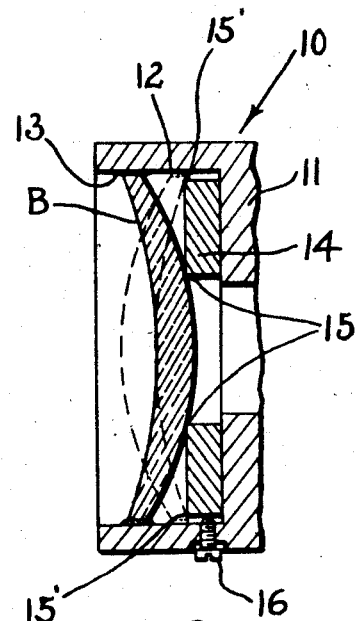
Fig.3.
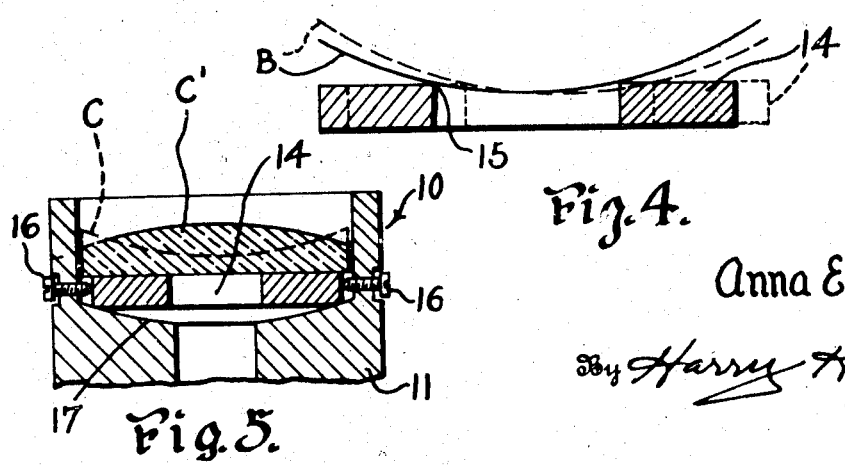
Fig.4.
Fig.5.
Inventor
Anna Estelle Glancy.
By Harry H. Styll
Attorney Patented July 30, 1929.

1,722,520

UNITED STATES PATENT OFFICE.

ANNA ESTELLE GLANCY, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

LENS-SEATING DEVICE.

Application filed November 11, 1925. Serial No. 68,352.

This invention relates to improved means employed for mounting lenses in separated lens systems, and consists primarily of a new and novel method for adjusting the angle of the lenses in such separated lens systems as are commonly employed in various types of both lens and eye testing instruments.

In the mounting of separated lens systems the perfect adjustment of the two or more components or lenses constituting the system with respect to one another may be very essential, as a small degree of tilting of one component with respect to the other can be detected by the effect on the optical image; that is to say, should either of the components become tilted with respect to the other, even to a minute degree, it will produce aberrations on the optical image. Heretofore the perfect adjustment of these components has always been both a tedious and difficult task. The present invention has been designed, therefore, to overcome the difficulties encountered in the mounting of such systems.

The present invention has for its principal object the provision of an improved method for adjusting the lenses for small amounts of tilting when mounting the same in a separated lens system.

Another object of the invention is to provide such a method wherein the lens will be in perfect control of adjustment no matter how minute may be the adjustment required.

Still another object is to provide such a method and means for accomplishing the same, which will be applicable to both concave and convex lenses in order that either type may be employed in the system and may be equally well adjusted.

A still further object is to provide such means which is extremely simple in construction, yet thorough and efficient in practice, and an advance in the art.

Other advantages, together with various novel features of construction of the present invention, will be more readily apparent by reference to the following specification taken in connection with the accompanying drawings, wherein similar characters denote corresponding parts throughout the several views.

In the drawings:

Figure 1 is a diagrammatic view showing a separated lens system composed of two components and illustrating the problem the present invention is designed to overcome;

Figure 2 is a top plan view of means constructed in accordance with the present invention for adjusting the angle of the lens;

Figure 3 is a view on line 3—3 of Figure 2;

Figure 4 is a diagrammatic view showing the principle of operation of the present invention.

Figure 5 is a view showing the manner of adjusting a plano lens.

As hereinabove stated, the perfect adjustment of two or more components forming a separated lens system may be very essential as a very small degree of tilting of one component with respect to the other can be detected by the effect on the optical image.

For example, let us assume by reference to Figure 1, that the lens system under consideration comprises the separated components or lenses A and B. When these lenses are properly mounted in an instrument the optical axes thereof must be coincident with each other and should either of these lenses be tilted at an angle with respect to the other, even to a minute degree, this tilting can be detected through the aberrations which will be produced on the optical image.

When the lenses A and B are properly mounted they should assume the relative positions with respect to each other as indicated by the full lines, Figure 1, but as soon as one becomes tilted relative to the other, such as denoted by dotted lines B' it materially affects the efficient performance of the instrument, and it is, therefore, essential that the tilted lens be adjusted until its optical center is again coincident with the optical center of the other lens or lenses.

The present invention has for its purpose the accomplishing of this adjustment, and this is achieved in the present instance by mounting either one or all of the lenses constituting the system in separate lens cells 10, which cells are subsequently mounted in the testing instrument (not shown). For the purpose of illustration, however, and as an example, there is shown only one cell 10, on which is mounted the lens B. The cell 10 includes a body portion 11 being formed with an extended annular shoulder 12 said lens being retained within the cell through the use of a small amount of cementitious material 13 placed between the periphery thereof and the shoulder 12.

Also arranged within the cell and positioned between the lens and the body portion 11 is a ring 14, the inner edge of which contacts with the lens as at 15, but is of a slightly smaller diameter than the same. Passing through the shoulder of the cell are a plurality of adjusting screws 16 which contact with the periphery of the ring. These screws may be positioned at any desired points around the circumference of the cell and, of course, any number may be employed.

In the mounting of the lens, the ring 14, together with the lens B, are first positioned within the cell 10, as stated above, the lens resting against the ring at the point 15 and secured within the cell by the use of a small amount of the cementitious material 13. While the cement, or the like, is still warm, the cell is mounted within the instrument (not shown), which instrument, let us assume already contains a lens A. Should it then be found that the optical axes of the lenses A and B are not coincident with each other, but instead that the lens B is slightly tilted at an angle to the lens A, which, as brought out above, can be readily detected by the effect on the optical image, the ring is moved sidewise upon operation of the adjusting screws 16, and as the lens rests upon the inner edge of the ring the sliding thereof will effect a slight tilting or movement of the lens, this principle being clearly illustrated by the full and dotted lines in Figure 4. After the lenses A and B have been properly adjusted with respect to one another the cementitious material is permitted to harden, whereby the lens will be securely held against displacement in the cell. The above principle remains the same whether the lens surface is concave or convex.

When the concave surface of the lens is placed in contact with the ring the surface of said lens engages the outer edge of the ring, as at 15' instead of the inner edge as is the case with the convex surface.

In case it is desired to use a plano concave or plano convex lens C and C', as shown in figure 5, the wall 17 of the cell against which the ring 14 rests may be concave as illustrated and the plane surface of the lens placed in contact with said ring. The adjustment of the lens will then be effected by the movement of the ring on the concave surface.

From the above it will be readily appreciated that there has been provided a method and means for mounting and adjusting lenses in separated lens systems and wherein the perfect adjustment of the lenses can be always achieved in an efficient manner with the expenditure of a minimum amount of time and labor.

It is also to be understood that the details herein shown have been disclosed merely for the purpose of illustration, and the right is reserved to make any such modifications as are found desirable without departing from or exceeding the spirit of the invention so long as such modifications fall within the scope of the appended claims.

What is claimed is:

1. A separate cell combined lens and mounting therefor comprising an annular cell having a transverse seat and a longitudinal axial opening through the seat, an annular lens seat smaller in diameter than the cell annulus and having a longitudinal axial opening therethrough and seated on the transverse cell seat, the face surfaces of said annulus being substantially parallel to each other and normal to the longitudinal axial line of the cell, a lens in the cell having a smaller diameter than the cell and having a convex surface resting on the outer edges of the opening in the lens seat, adjustable screw means through the walls of the cell engaging the edge of the lens seat and a time hardening cementitious medium between the edges of the lens and the inner walls of the cell.

2. A separate cell combined lens and mounting therefor comprising an annular cell having a transverse seat and a longitudinal axial opening through the seat, an annular lens seat smaller in diameter than the cell annulus and having a longitudinal axial opening therethrough and seated on the transverse cell seat, the face surfaces of said annulus being substantially parallel to each other and normal to the longitudinal axial line of the cell, a lens in the cell having a smaller diameter than the cell and having a surface resting on the lens seat, and adjustable means associated with the cell and engaging the lens seat adapted to position the same in the cell.

3. A separate cell combined lens and mounting therefor comprising an annular cell having a transverse seat and a longitudinal axial opening through the seat, an annular lens seat smaller in diameter than the cell annulus and having a longitudinal axial opening therethrough and seated on the transverse cell seat, the face surfaces of said annulus being substantially parallel to each other and normal to the longitudinal axial line of the cell, a lens in the cell having a smaller diameter than the cell and having a surface resting on the lens seat, adjustable means associated with the cell and engaging the lens seat adapted to position the same in the cell, and a time hardening cementitious medium between the edges of the lens and the inner walls of the cell.

4. A separate cell combined lens and mounting therefor comprising an annular cell having a transverse seat, a longitudinal axial opening through the seat and outer walls parallel with the longitudinal axial line of the cell, an annular lens seat smaller in diameter than the cell annulus and having a longitudinal axial opening therethrough and seated on the transverse cell seat the face surfaces of said annulus being substantially parallel to each other and normal to the longitudinal axial line of the cell, a lens in the cell having a smaller diameter than the cell and having a convex surface resting on the outer edges of the opening in the lens seat, adjustable screw means through the walls of the cell engaging the edge of the lens seat and a time hardening cementitious medium between the edges of the lens and the inner walls of the cell.

5. A separate cell combined lens and mounting therefor comprising an annular cell having a transverse seat, a longitudinal axial opening through the seat and outer walls parallel with the longitudinal axis of the cell, an annular lens seat smaller in diameter than the cell annulus and having a longitudinal axial opening therethrough and seated on the transverse cell seat, the face surfaces of said annulus being substantially parallel to each other and normal to the longitudinal axial line of the cell, a lens in the cell having a smaller diameter than the cell and having a surface resting on the lens seat, and adjustable means associated with the cell and engaging the lens seat adapted to position the same in the cell.

ANNA ESTELLE GLANCY.